(12) United States Patent
Guilleminot et al.

(10) Patent No.: US 9,961,721 B2
(45) Date of Patent: May 1, 2018

(54) USER INTERFACE FOR OVEN: INFO MODE

(71) Applicant: BSH Home Appliances Corporation, Irvine, CA (US)

(72) Inventors: Raphael Guilleminot, San Francisco, CA (US); Phillip Montanye, New Bern, NC (US); Graham Sadtler, Huntington Beach, CA (US); Robert Tannen, Philadelphia, PA (US)

(73) Assignee: BSH Home Appliances Corporation, Irvine, CA (US)

(*) Notice: Subject to any disclaimer, the term of this patent is extended or adjusted under 35 U.S.C. 154(b) by 979 days.

(21) Appl. No.: 13/743,462

(22) Filed: Jan. 17, 2013

(65) Prior Publication Data

US 2014/0201664 A1 Jul. 17, 2014

(51) Int. Cl.
*G06F 3/0484* (2013.01)
*H05B 1/02* (2006.01)
*H05B 6/64* (2006.01)
*F24C 7/08* (2006.01)

(52) U.S. Cl.
CPC ............ *H05B 1/0263* (2013.01); *F24C 7/08* (2013.01); *H05B 6/6435* (2013.01); *F24C 7/086* (2013.01); *G06F 3/0484* (2013.01)

(58) Field of Classification Search
CPC ............................... G06F 3/0484; F24C 7/086
USPC .......................................................... 715/771
See application file for complete search history.

(56) References Cited

U.S. PATENT DOCUMENTS

| 3,837,568 | A | * | 9/1974 | Goodhouse et al. ....... 235/61 A |
| 3,872,463 | A | | 3/1975 | Lapeyre |
| 4,109,245 | A | | 8/1978 | Hedin |
| 5,111,028 | A | | 5/1992 | Lee |
| 6,252,206 | B1 | | 6/2001 | Leukhardt, III et al. |
| 6,750,433 | B2 | | 6/2004 | Guenther et al. |
| 6,934,592 | B2 | | 8/2005 | Hood |

(Continued)

FOREIGN PATENT DOCUMENTS

EP 0651572 A2 5/1995

OTHER PUBLICATIONS

Jenn-Air, "Jenn-Air Built-In Electric Single and Double Oven—Use & Care Guide", 2011, Jenn-Air, pp. 1-35.*

(Continued)

*Primary Examiner* — Nicholas Klicos
(74) *Attorney, Agent, or Firm* — Michael E. Tschupp; Andre Pallapies; Brandon G. Braun

(57) ABSTRACT

A method for controlling a domestic appliance having a display, at least two distinct user input components, and a controller, the method comprising: displaying a first screen on the display; detecting user input to a first user input component; displaying a second screen on the display, said second screen comprising an info mode home screen; detecting user input to a second user input component; determining an info mode sub-category associated with the user input to the second user input component with the controller; and displaying a third screen on the display based on the info mode sub-category determined by the controller, said third screen comprising one of an accessories selection screen showing a plurality of accessories, a food category selection screen showing a plurality of food categories, and an oven mode selection screen showing a plurality of oven modes.

22 Claims, 17 Drawing Sheets

(56) References Cited

U.S. PATENT DOCUMENTS

| | | |
|---|---|---|
| 6,936,801 B1 | 8/2005 | Head |
| 6,976,004 B2 | 12/2005 | Wittrup |
| 7,012,220 B2* | 3/2006 | Boyer et al. ................ 219/411 |
| 7,057,142 B1 | 6/2006 | Lubrina |
| 7,126,088 B2* | 10/2006 | Horton et al. ............... 219/412 |
| 7,381,930 B2 | 6/2008 | Fisher |
| 7,436,317 B2 | 10/2008 | Becke et al. |
| 8,136,442 B2* | 3/2012 | Strutin-Belinoff et al. .... 99/331 |
| 8,843,825 B1 | 9/2014 | Whitman |
| 2001/0039460 A1* | 11/2001 | Aisa ............................. 700/17 |
| 2004/0200828 A1* | 10/2004 | Becker et al. ................ 219/506 |
| 2006/0289465 A1 | 12/2006 | Balk et al. |
| 2007/0057079 A1 | 3/2007 | Stark |
| 2007/0278320 A1 | 12/2007 | Lunacek |
| 2007/0298405 A1 | 12/2007 | Ebrom et al. |
| 2008/0109243 A1 | 5/2008 | Ebrom et al. |
| 2008/0109311 A1 | 5/2008 | Ebrom et al. |
| 2009/0306827 A1 | 12/2009 | Kim et al. |
| 2010/0147823 A1 | 6/2010 | Anderson et al. |
| 2010/0238183 A1* | 9/2010 | Sakanaka et al. ............ 345/501 |
| 2011/0062143 A1 | 3/2011 | Satanek |
| 2011/0087987 A1* | 4/2011 | Brown ......................... 715/771 |
| 2011/0090255 A1 | 4/2011 | Wilson et al. |
| 2011/0151072 A1 | 6/2011 | Anderson et al. |
| 2012/0032514 A1 | 2/2012 | Alberghetti et al. |
| 2012/0074123 A1 | 3/2012 | Hodapp, Jr. et al. |
| 2012/0248879 A1 | 10/2012 | Arrigoni et al. |
| 2013/0067419 A1 | 3/2013 | Eltoft |
| 2013/0092033 A1* | 4/2013 | Murphy et al. ................ 99/342 |
| 2013/0093685 A1 | 4/2013 | Kalu et al. |
| 2013/0141371 A1 | 6/2013 | Hallford et al. |
| 2013/0145295 A1 | 6/2013 | Bocking |
| 2013/0154959 A1 | 6/2013 | Lindsay et al. |
| 2013/0191754 A1 | 7/2013 | Rose |
| 2013/0214935 A1* | 8/2013 | Kim et al. ............... 340/870.02 |
| 2013/0269539 A1* | 10/2013 | Polt ................................ 99/331 |
| 2013/0277353 A1 | 10/2013 | Joseph et al. |
| 2013/0321444 A1 | 12/2013 | Efrati et al. |
| 2014/0123183 A1 | 5/2014 | Fujimoto et al. |
| 2014/0317501 A1* | 10/2014 | Brasseur et al. ............. 715/702 |

OTHER PUBLICATIONS

Manufacturer: Gaggenau, Gaggenau 200 Series BO251, Online: AJMadison.com, Accessed Jun. 11, 2012.

Apple, Inc., "iPad User Guide for iOS 5.1 Software", 2012, pp. 1-144.

Gorenje iChef—Global revolution through touch control, Online: Gorenje.com, 2011.

Sarah Branny, Awesome Samsung Fridge With Built-in Tablet, Online: Techmento.com, Jul. 2011.

Angela Wardriver, Electrolux Design Concept "Heart of the Home" animation, Online: Dailyfork.com, Mar. 9, 2010.

The CDA Group, Ltd., SV310SS Oven—Manual for Installation, Use and Maintenance, Jun. 8, 2012.

Mark Hamblin, Taking touch to New Frontiers: Why It Makes Sense and How to Make It Happen, Information Display, vol. 26, Issue 3, p. 36-39, Jan. 1, 2010.

SieMatic, sieMatic 51-Grid, Online: Houseautomator.com, Nov. 13, 2009.

Elliot Thomas Chapple, Integrating Interactive Systems Within The Home Environment, Online: bath.ac.uk, 2008.

Sarah Mennicken, Personalchef—Cooking Guidance Through an Interactive Multi-Display Kitchen Counter, Online: RWTH Aachen University, Publication: Jun. 24, 2009.

Manufacturer: Electrolux, Electrolux—Introducing The New Collection, Online: AJMadison.com, Publication: Jan. 2008.

* cited by examiner

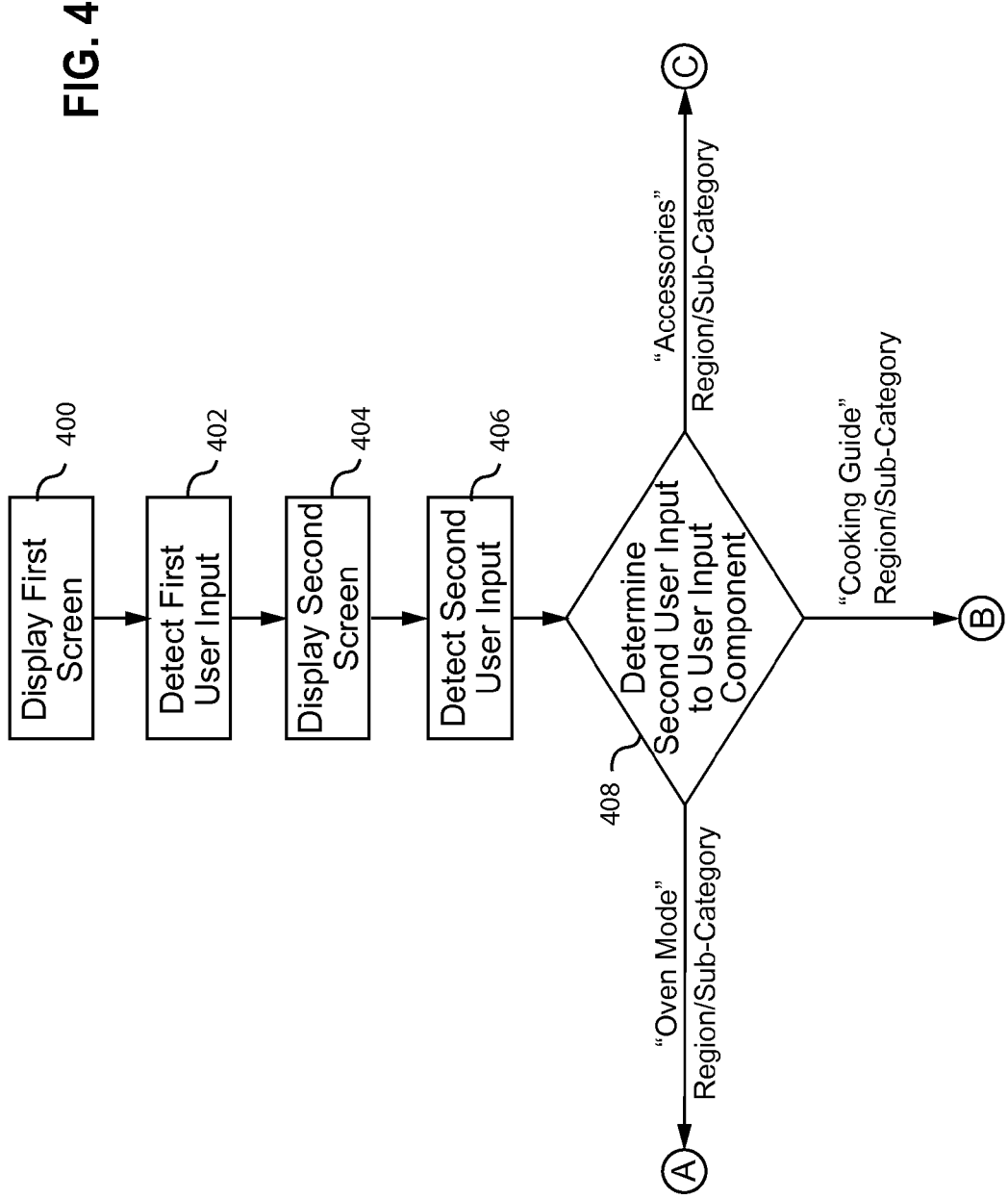

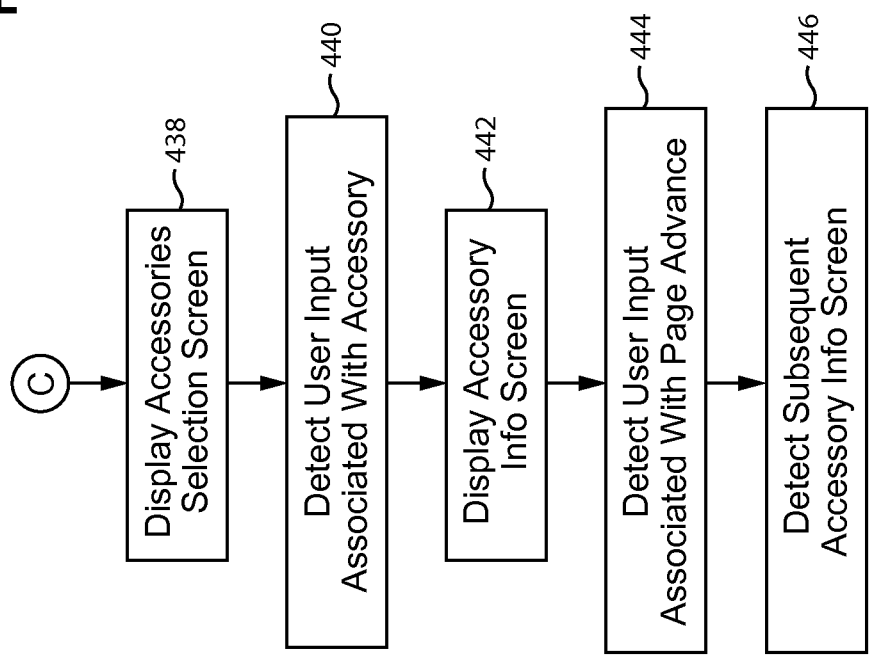

USER INTERFACE FOR OVEN: INFO MODE

FIELD OF THE TECHNOLOGY

The present technology relates to a method of controlling a domestic appliance. More particularly, the present technology relates to a method of controlling a domestic appliance to display information screens on a display.

BACKGROUND OF THE TECHNOLOGY

Commonly, modern domestic appliances are very advanced and are capable of performing a wide range of treatment functions and may include a variety of accessories to facilitate those functions. Modern appliances are also capable of much more advanced communication with a user. For example, modern appliances commonly include more advanced displays to communicate with the user.

The oven is a particular type of domestic appliance that is capable of a wide range of treatment functions. For example, an oven may be able to treat its contents by baking (conventional or convection), broiling, keeping warm, etc. Also, a number of accessories may be provided to facilitate the treating process. For example, a variety of support devices, such as a rack, may be supported within the oven to in turn support the contents during treatment. Also, a feedback device, such as a temperature probe, may be used to provide a more accurate measurement of the temperature of the contents during treatment. With this variety of treatment functions and accessories, the modern oven, therefore, is also flexible enough to effectively treat or cook a number of different foods that may have different requirements for preparation.

Since the modern oven may be capable of a number treatment functions, may use of a number of accessories, and may be capable of treating a variety of foods, the user must be able to operate the oven with the variety of situations presented by these factors. This difficulty is presently overcome by the inclusion of a user manual with the appliance to explain the oven's operation. However, this may require the user to keep the manual in an accessible location and referring to it may not be practical or desirable.

Therefore, a need has developed to address one or more shortcomings of the prior art.

SUMMARY OF THE TECHNOLOGY

One aspect of the present technology is to provide an information or info mode for a domestic appliance that overcomes one or more shortcomings of the prior art.

Another aspect of the present technology is directed to a method for controlling a domestic appliance having a display, at least two distinct user input components, and a controller. The method includes displaying a first screen on the display, detecting user input to a first user input component, displaying a second screen on the display, said second screen comprising an info mode home screen, detecting user input to a second user input component, determining an info mode sub-category associated with the user input to the second user input component with the controller, and displaying a third screen on the display based on the info mode sub-category determined by the controller, said third screen comprising one of an accessories selection screen showing a plurality of accessories, a contents category selection screen showing a plurality of contents categories, and a treatment mode selection screen showing a plurality of treatment modes.

In examples, (a) the contents category selection screen may comprise a food category selection screen showing a plurality of food categories and the treatment mode selection screen may comprise an oven mode selection screen showing a plurality of oven modes, (b) when the controller determines that the user input was made to an oven mode sub-category, the third screen may be the oven mode selection screen, and when the controller determines that the user input was made to the oven mode sub-category, the method may include detecting user input associated with an oven mode of a plurality of oven modes to the second user input component and displaying an oven mode info screen associated with and showing information about the selected oven mode, (c) the method may include detecting user input to the second user input component, determining whether the user input is associated with a page advance or a quantity of oven racks with the controller, and when the user input is determined to be associated with a page advance, displaying an additional oven mode info screen associated with and showing information about the selected oven mode, or when the user input is determined to be associated with a quantity of oven racks, displaying a rack position info screen showing information about oven rack positioning, (d) when the controller determines that the user input was made to an accessories sub-category, the third screen may be the accessories selection screen, and when the controller determines that the user input was made to the accessories sub-category, the method may include detecting user input associated with an accessory of a plurality of accessories to the second user input component and displaying an accessory info screen associated with and showing information about the selected accessory, (e) when the controller determines that the user input was made to a cooking guide sub-category, the third screen may be the food category selection screen, and when the controller determines that the user input was made to the cooking guide sub-category, the method may include detecting user input associated with a food category to the second user input component, displaying a food type selection screen associated with the selected food category and showing a plurality of food types, detecting user input associated with a food type to the second user input component, and displaying a food type info screen associated with and showing information about the selected food type, (f) the method may include detecting user input to the second user input component, determining whether the user input is associated with a page advance or a quantity of oven racks with the controller, and when the user input is determined to be associated with a page advance, displaying an additional food type info screen associated with and showing information about the selected food type, or when the user input is determined to be associated with a quantity of oven racks, displaying a rack position info screen showing information about oven rack positioning.

Another aspect of the present technology is directed to a domestic appliance to treat contents. The domestic appliance includes a display, a first user input component configured to detect user input, a second user input component configured to detect user input and distinct from the first user input component, and a controller programmed to: instruct the display to display a first screen, receive user input detected by the first user input component, instruct the display to display a second screen, said second screen comprising an info mode home screen, receive user input detected by the second user input component, determine an info mode sub-category associated with the user input to the second user input component, and instruct the display to display a third screen based on the info mode sub-category determined by the controller, said third screen comprising one of an accessories selection screen showing a plurality of accessories, a contents category selection screen showing a plurality of contents categories, and a treatment mode selection screen showing a plurality of treatment modes.

In examples, (a) the contents category selection screen may comprise a food category selection screen showing a plurality of food categories and the treatment mode selection screen may comprise an oven mode selection screen showing a plurality of oven modes (b) when the info mode sub-category determined by the controller is an oven mode sub-category, the third screen may be the oven mode selection screen, and when the info mode sub-category determined by the controller is the oven mode sub-category, the controller may be programmed to receive user input associated with an oven mode of a plurality of oven modes detected by the second user input component and instruct the display to display an oven mode info screen associated with and showing information about the selected oven mode, (c) the controller may be programmed to receive user input associated with a page advance or a quantity of oven racks detected by the second user input component, determine whether the user input is associated with a page advance or a quantity of oven racks with the controller, and when the user input is determined to be associated with a page advance, instruct the display to display an additional oven mode info screen associated with and showing information about the selected oven mode, or when the user input is determined to be associated with a quantity of oven racks, instruct the display to display a rack position info screen showing information about oven rack positioning, (d) when the info mode sub-category determined by the controller is an accessories sub-category, the third screen may be the accessories selection screen, and when the info mode sub-category determined by the controller is the accessories sub-category, the controller may be programmed to receive user input associated with an accessory of a plurality of accessories detected by the second user input component, and instruct the display to display an accessory info screen associated with and showing information about the selected accessory, (e) when the info mode sub-category determined by the controller is a cooking guide sub-category, the third screen may be the food category selection screen, and when the info mode sub-category determined by the controller is a cooking guide sub-category, the controller may be programmed to receive user input associated with a food category detected by the second user input component, instruct the display to display a food type selection screen associated with the selected food category showing a plurality of food types, receive user input associated with a food type detected by the second user input component, and instruct the display to display a food type info screen associated with and showing information about the selected food type, (f) the controller may be programmed to receive user input associated with a page advance or a quantity of oven racks detected by the second user input component, determine whether the user input is associated with a page advance or a quantity of oven racks with the controller, and when the user input is determined to be associated with a page advance, instruct the display to display an additional food type info screen associated with and showing information about the selected food type, or when the user input is determined to be associated with a quantity of oven racks, instruct the display to display a rack position info screen showing information about oven rack positioning.

Other aspects, features, and advantages of this technology will become apparent from the following detailed description when taken in conjunction with the accompanying drawings, which are a part of this disclosure and which illustrate, by way of example, principles of this technology.

BRIEF DESCRIPTION OF THE DRAWINGS

The accompanying drawings facilitate an understanding of the various examples of the present technology. In such drawings:

FIG. 4 is a flowchart of a method of controlling a domestic appliance, according to an example of the present technology.

FIGS. 4A-4C are flowcharts of further methods of controlling a domestic appliance that may be performed with the method shown in FIG. 4, according to an example of the present technology.

DETAILED DESCRIPTION OF ILLUSTRATED EXAMPLES

The following description is provided in relation to several examples which may share common characteristics and features. It is to be understood that one or more features of any one example may be combinable with one or more features of the other examples. In addition, any single feature or combination of features in any of the examples may constitute additional examples.

Figure 1:
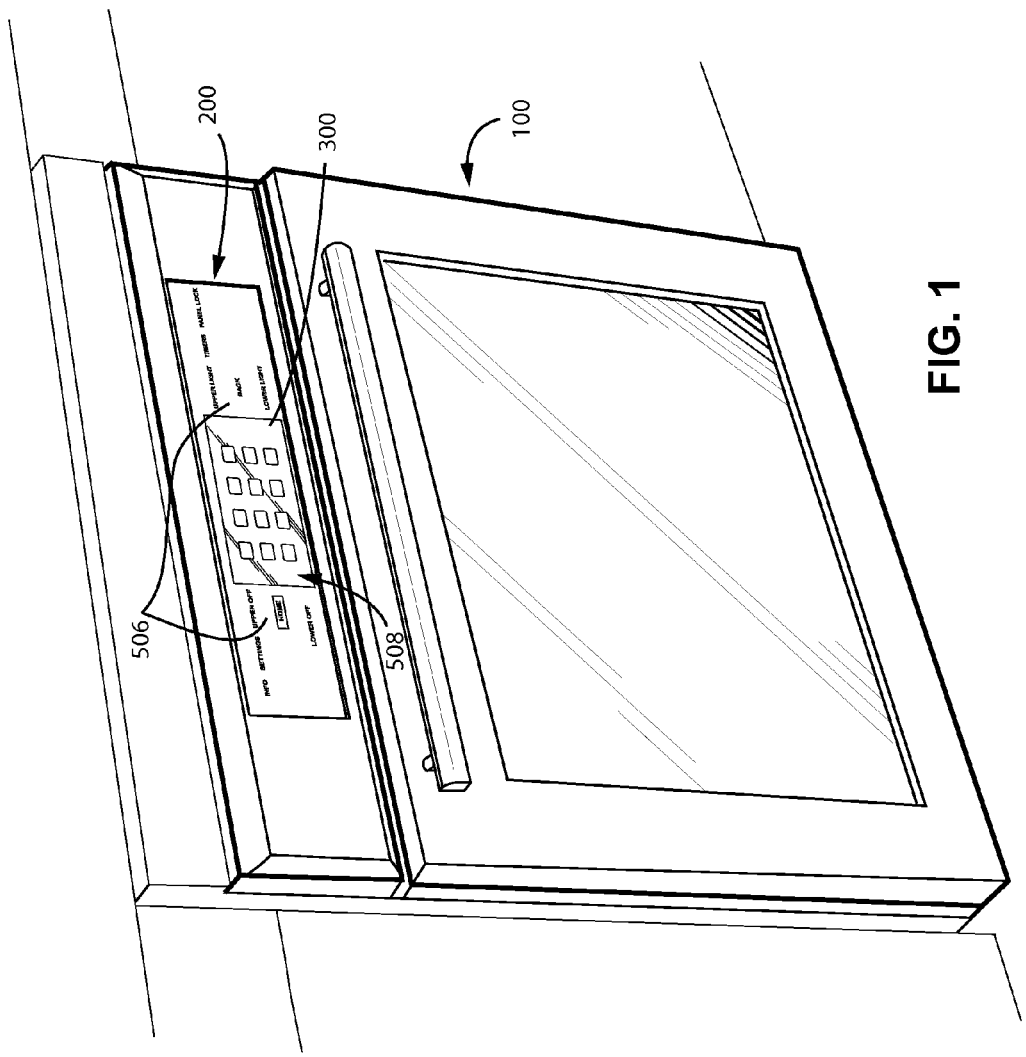
FIG. 1 is a perspective view of a domestic appliance having a user interface, according to an example of the present technology.

FIG. 1 shows a perspective view of a domestic appliance 100 installed as it commonly would be in a home. The particular domestic appliance 100 shown is an oven installed in a wall of a kitchen. The domestic appliance 100 of FIG. 1 shows a user interface 200 having a display 300. In this example, the display 300 may be a thin film transistor display and may include at least one user input component 508 that may be a capacitive touch input element. The at least one user input component 508 may also be coextensive with the display 300. Also in this example, the user interface 200 may include a plurality of buttons 506 that also include capacitive touch elements.

Figure 2:
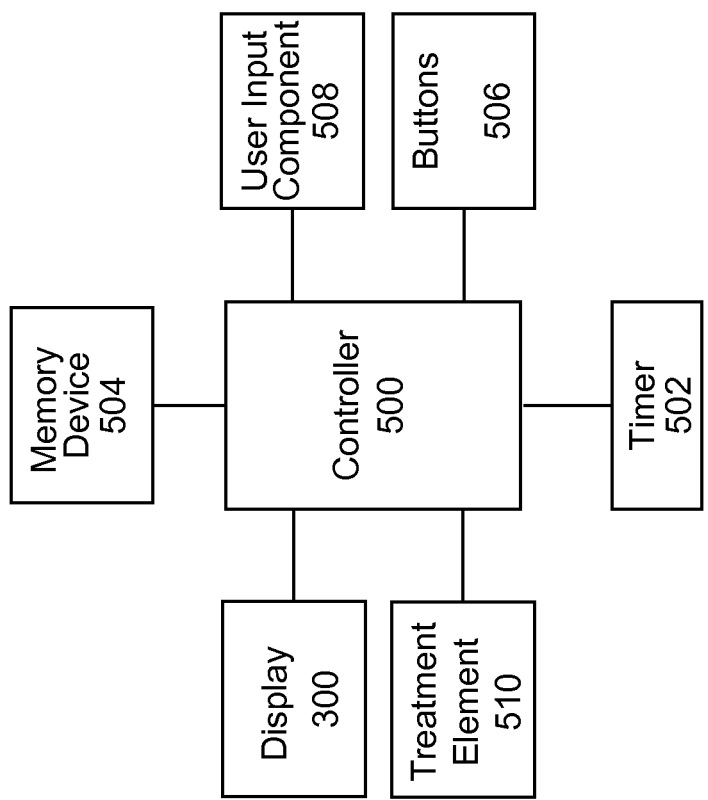
FIG. 2 is a schematic of the user interface, according to an example of the present technology.

FIG. 2 shows a schematic of the components of the user interface of a domestic appliance in accordance with the present technology. The components may include a controller 500 for coordinating the operation of the user interface. A display 300 may be operationally controlled by the controller 500. A timer 502 may be included to time how long a particular screen is displayed on the display 300 or to time a period of inactivity. The period of inactivity being a time during which no user input is detected by the system. The user input component 508 may be any type of component that receives an input from a user and communicates or programs the same to the controller 500. Specifically, it is envisioned that commonly known touchscreen input devices, such as a capacitive touch input element, will comprise the user input component. The buttons 506 may also communicate or program various user inputs to the controller 500. The buttons 506 may be capacitive touch buttons or may comprise a capacitive touch input element. The user would then manually input the parameters by touching the user interface. A memory device 504 may also be included to store the functional parameters (e.g., treatment time, treatment mode, treatment temperature, etc.) input to the controller 500 through the user input component 508. At least one treatment element 510 may also be included for the treatment of the contents of the appliance.

Figure 3:
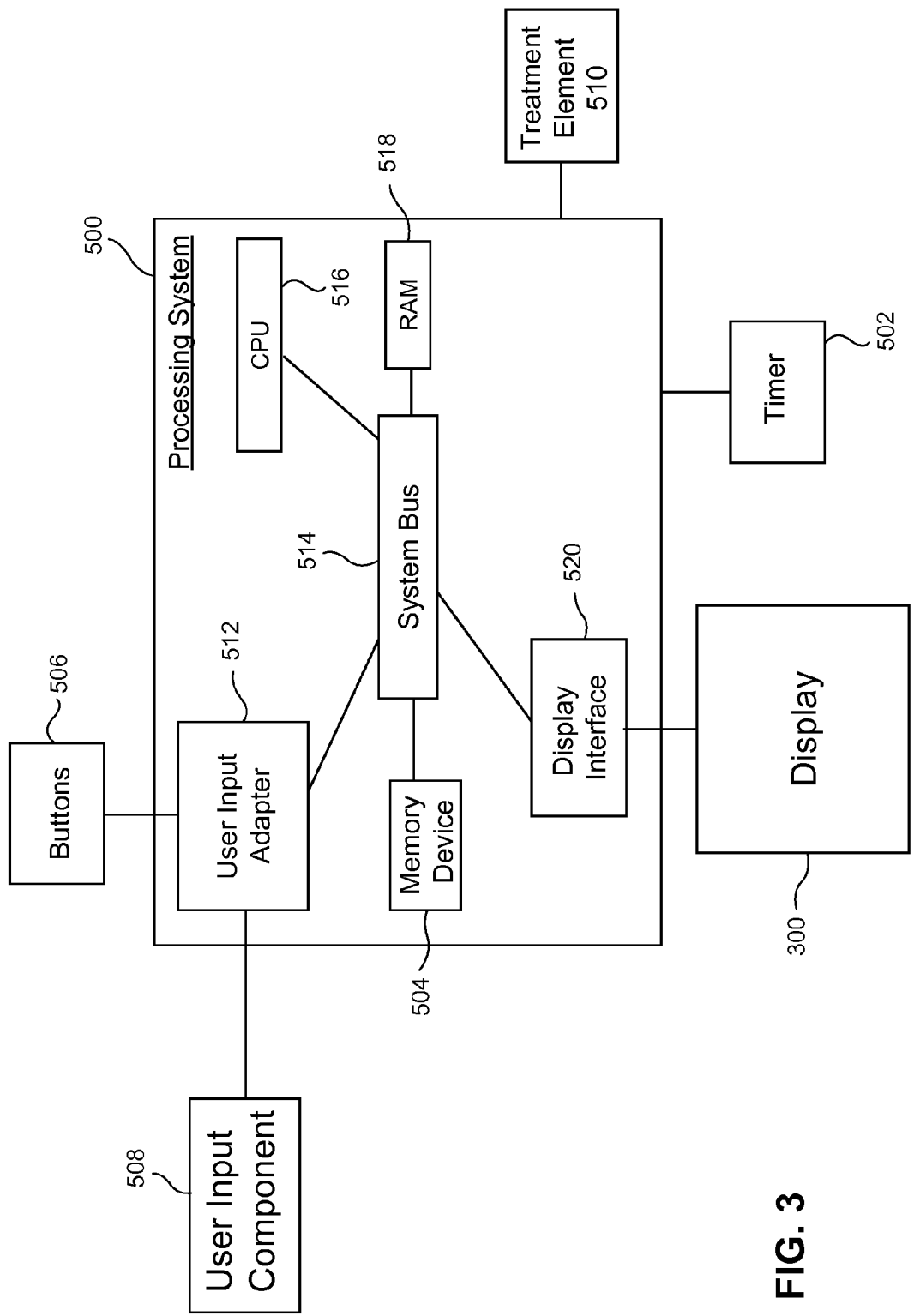
FIG. 3 is a block diagram of a processing system of the user interface, according to an example of the present technology.

FIG. 3 is a block diagram of an exemplary computing system according to certain examples. A processing system or controller 500 may include a central processing unit or CPU 516, a system bus 514 that communicates with RAM 518 and storage or a memory device 504. The storage 504 can be magnetic, flash based, solid state, or other storage technology. The system bus 514 may also communicate with a user input adapter 512 that allows users to input commands to the processing system via a user input component 508 (e.g., a touch input element or the like) and/or buttons 506. The results of the processing may be displayed to a user on a display 300 via a display interface 520 (e.g., a video card or the like). The memory device 504 may also be included to store the functional parameters (e.g., treatment time, treatment mode, treatment temperature, etc.) input to the controller 500 through the user input component 508. The controller 500 may also operate the treatment element 510.

The treatment element(s) 510 may be included to facilitate the treatment of contents by the domestic appliance 100. For example, the domestic appliance 100 may also include a chamber that holds the contents and a door to enclose the contents in the domestic appliance 100 and such domestic appliance may be an oven, a dishwasher, a washing machine, a drier, a microwave oven, a coffee maker, a refrigerator, and/or a freezer, etc. Thus, the contents may be food, consumable liquids, crockery, dishes, stoneware, flatware, bakeware, and/or clothing, etc. It is also contemplated that the domestic appliance may not necessarily include a chamber and door for enclosing the contents or items and in such a case the domestic appliance may be a vacuum cleaner, a blender, and an iron, etc. Treatment by the domestic appliance is contemplated to comprise cooking, baking, heating, steaming, sanitizing, dis-infecting, cooling, freezing, cleaning, washing, vacuuming, and/or blending, etc. The treatment element 510, in the example where the appliance 100 is an oven and the contents are food, is at least one heating element that may include an electric resistance heating element or a gas burner. A fan may also comprise the treatment element 510 in the case of a convection oven that performs convection heating of the food. Other treatment elements, as commonly known in the art, may also comprise the treatment element.

The processing system 500 may also communicate with the additional components of the domestic appliance, e.g., timer 502 and treatment element 510. It should also be noted that the timer 502 may be comprised within the processing system 500, rather than as a separate component.

Certain examples herein are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

FIG. 4 shows a flowchart of an exemplary method of controlling a domestic appliance 100 that may include an info mode to display information to a user. The info mode may include the display of various screens on the display 300 of the domestic appliance 100. The screens may display information about a variety of features associated with the domestic appliance. For example, the screens may display information about the various treatment modes by which the appliance may operate. In the case where the appliance is an oven, the treatment modes may include various conventional baking modes, convection baking modes, a keep warm mode, a clean mode, and a broil mode, amongst others. Also in the case where the appliance is an oven, the screens may include cooking guides that provide the user with information about how to prepare different food types with the oven. The food types may include meats, breads, pastries, cakes, and pies, amongst others. The info mode may also provide the user with information about various accessories that may be used with the appliance to enhance its functionality. In the case where the appliance is an oven, these accessories may include a temperature probe, oven racks, a rotisserie, and a broiler pan, amongst others.

Figure 15:
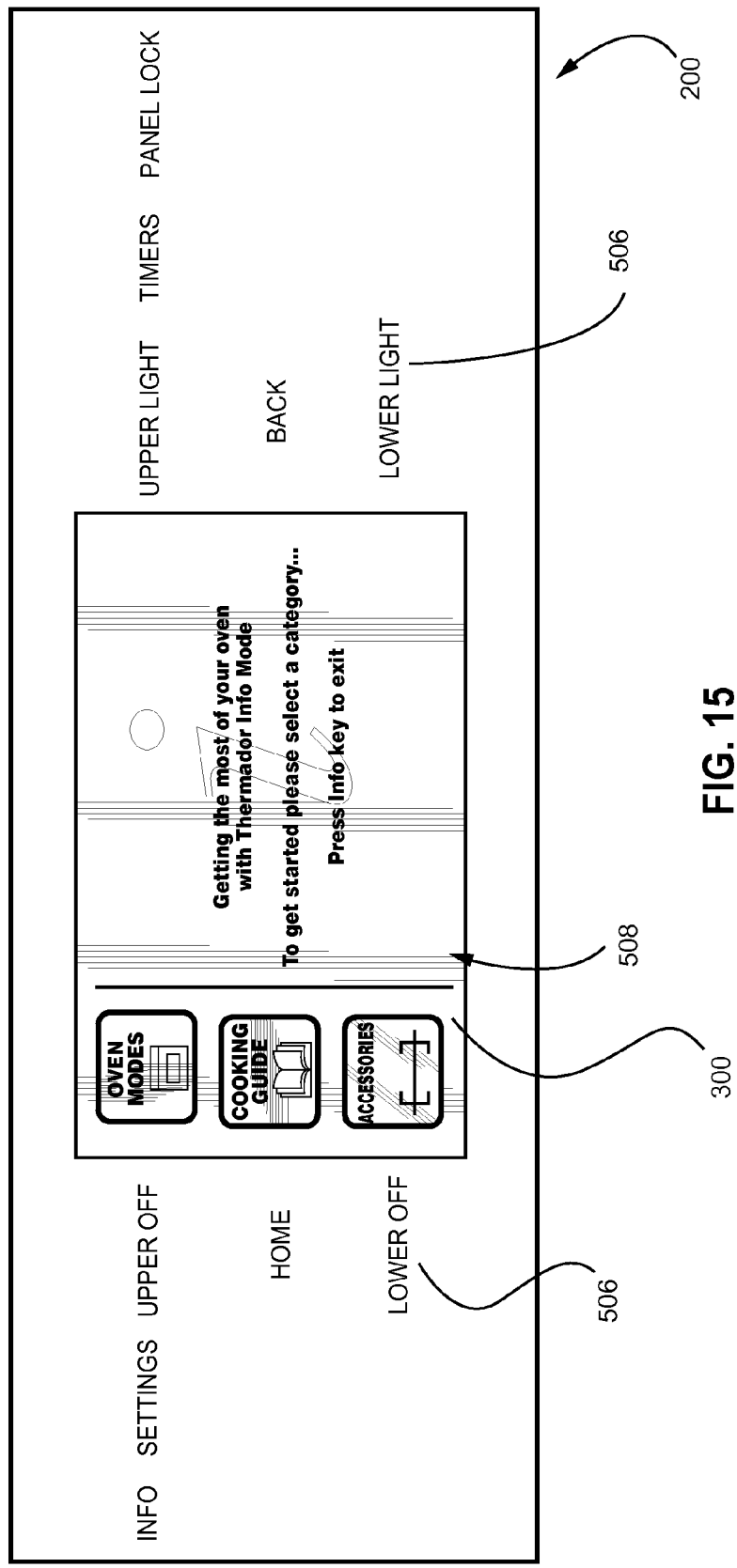
FIG. 15 is a front view of a display and user input components of the domestic appliance, according to an example of the present technology.

As to the steps of the method shown in the flowchart of FIG. 4, the method may begin with displaying a first screen on the display 300 of the domestic appliance 100. This step is exemplified by step 400. The user may then provide and a first user input component may receive or detect user input, as exemplified by step 402. The controller 500 may then receive this user input and instruct the display 300 to display a second screen or an info mode home screen 600. This function is exemplified by step 404. An exemplary info mode home screen 600 is shown in FIG. 5 and will be discussed in further detail below. The user may then provide and a second user input component may receive or detect user input, as exemplified by step 406. Upon receiving the user input from the second user input component, the controller 500 may then determine whether the user input corresponds to or is associated with a sub-category or one of a plurality of regions of the second screen. This function is exemplified by step 408. These sub-categories or regions may include a treatment mode sub-category, a contents sub-category, and an accessories sub-category. In the example where the domestic appliance is an oven, these sub-categories or regions may include an oven mode sub-category, a cooking guide sub-category, and an accessories sub-category. In one example of the present technology that is shown in FIG. 15 and will be discussed in greater detail below, the first user input component is one of a plurality of buttons 506 included on the user interface 200 and indicated by "INFO," while the second user input component 508 is a touch panel that is substantially coextensive with the display 300.

Once the controller 500 has determined which info mode sub-category the user has selected, the controller may instruct the display 300 to display a further selection screen associated with the chosen sub-category. The sub-categories may include those listed above if the appliance is an oven, such as an oven mode sub-category, a cooking guide sub-category, and an accessories sub-category.

The oven mode sub-category may describe for the user how the various treatment modes operate and how they can heat or cook food items. Additionally, it may inform the user the best place to locate the oven racks based on the number of racks desired by the user, which is in turn based on the quantity of items the user plans to treat, heat, or cook in the oven. The cooking guide sub-category may provide the user with information on how best to cook, heat, or treat various food types based on the available oven treatment modes. For example, meats may need to be cooked differently from breads which also may need to be cooked differently from pastries. The cooking guide will therefore guide the user in programming the oven. It may also advise the user where to place the oven racks based upon the number of racks necessary to support the quantity of food being cooked, while taking into account the recommended treatment. The accessories sub-category may provide the user with information on the use of various accessories that can accompany the appliance. Information provided in this sub-category may include how to place the oven racks within the appliance, how to connect a temperature probe, how to set up a rotisserie, and how to assemble and locate a broiler pan.

Other sub-categories are also envisioned as applicable to the particular appliance. For instance, a refrigerator may have info modes associated with various compartments, cooling and freezing modes, or accessories such as an ice maker or water dispenser. In the case of a dishwasher, the info mode may include an info mode pertaining to the various cleaning cycles by which it may operate. Also in the case of the dishwasher, an info mode may be included that informs the user which cleaning cycle would be appropriate for different types of crockery, dishes, glassware, silverware, etc., based on a level of dirtiness. Furthermore, an info mode for a dishwasher may advise the user how best to locate the contents to be cleaned based on size and shape and available space on the racks of the dishwasher. Also an info mode for a dishwasher may include information on how to use various accessories that may accompany the appliance.

Figure 4B:
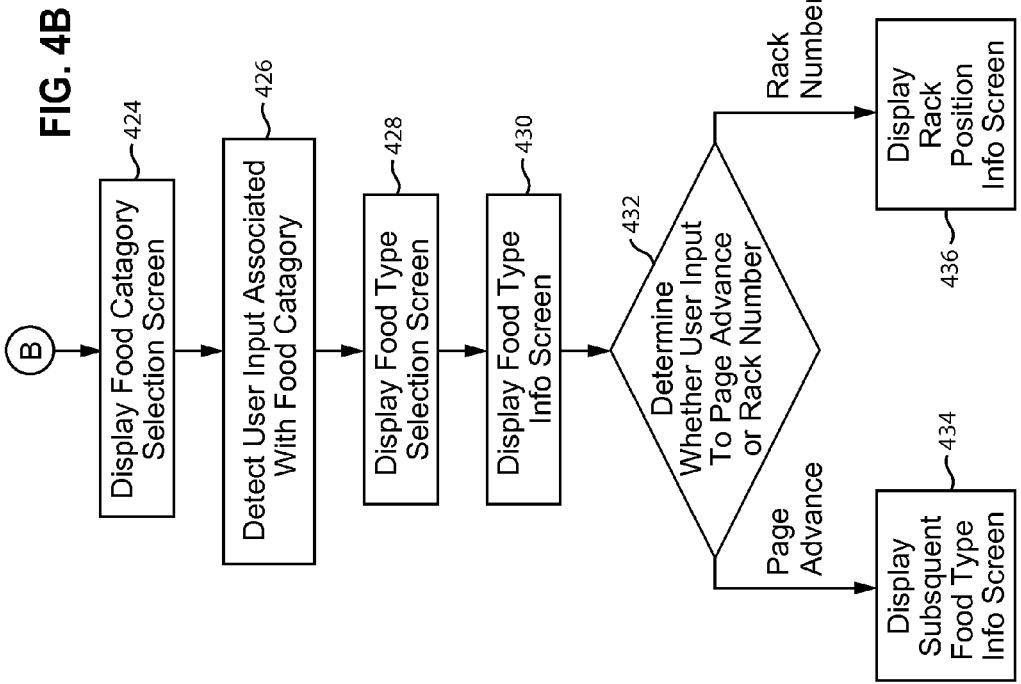
Figure 4A:
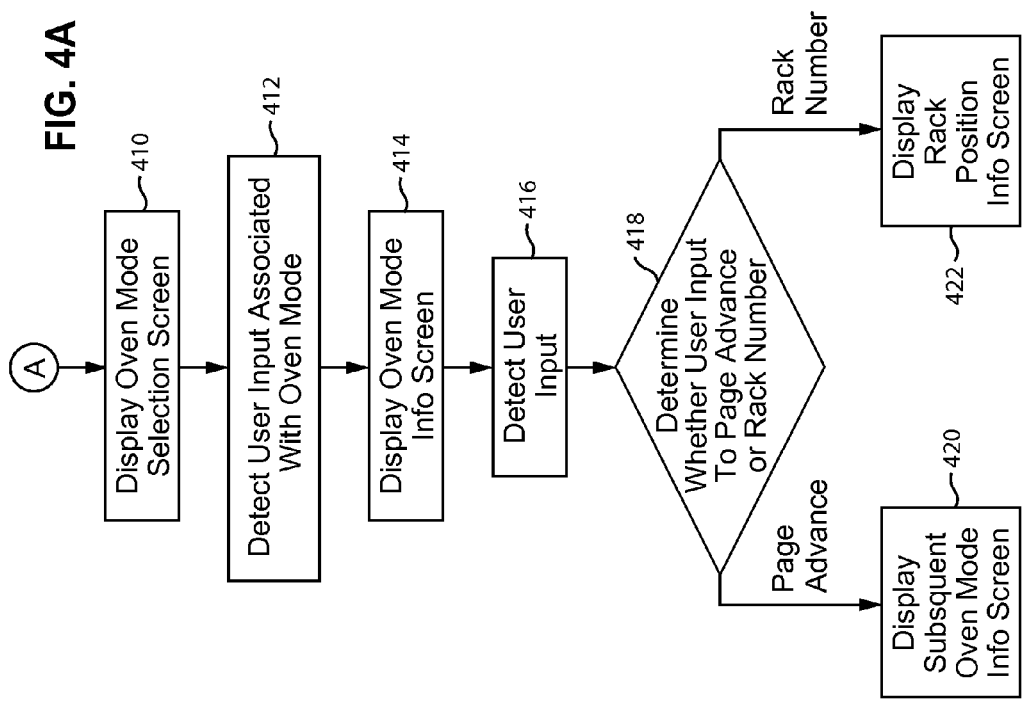
Figure 5:
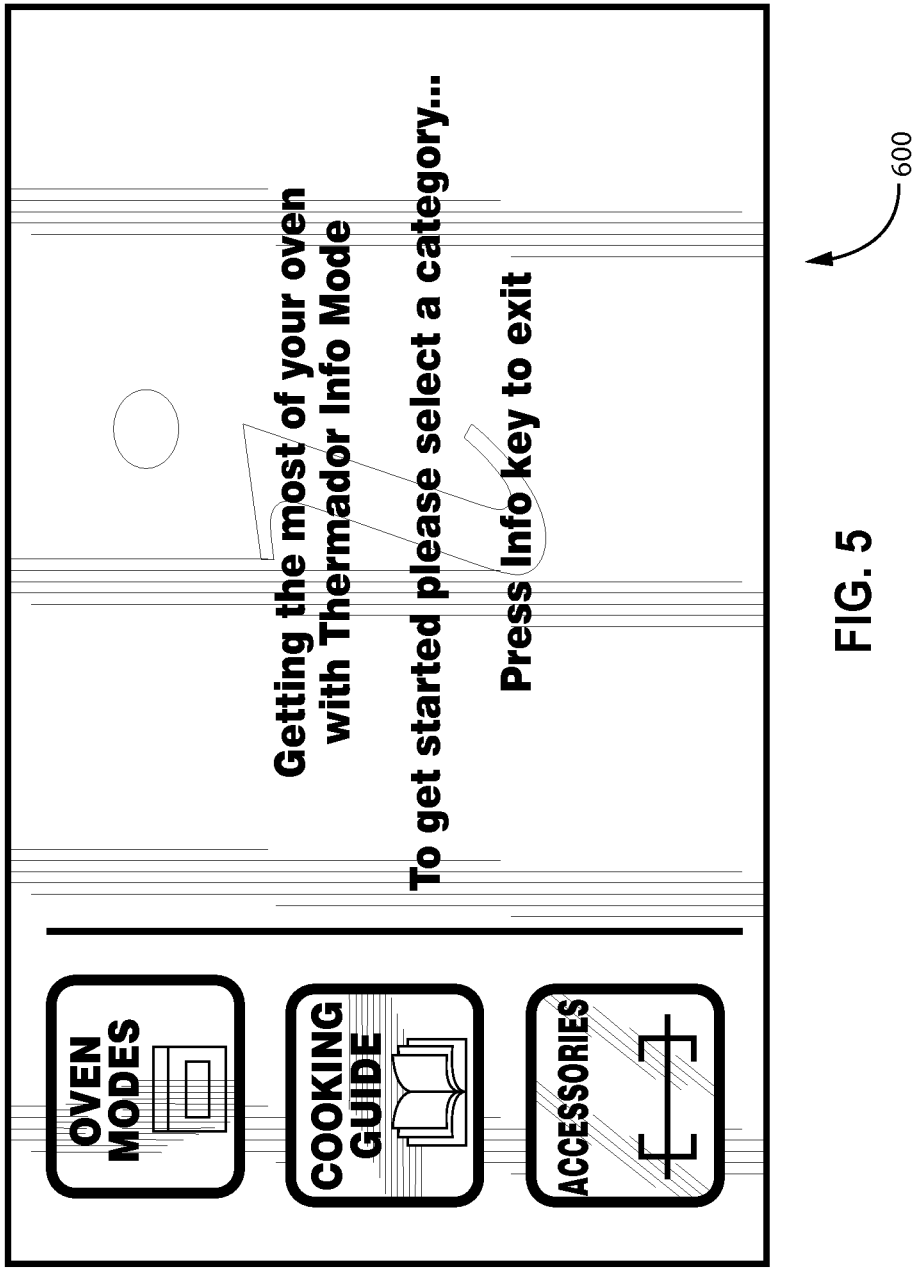
FIG. 5 is an info mode home screen that may be shown by the domestic appliance, according to an example of the present technology.

FIGS. 4A-4C show further steps of an exemplary method of controlling a domestic appliance as continued from the method shown in FIG. 4. FIG. 4A shows further steps of an exemplary method if the controller has determined that the user has chosen the treatment mode sub-category. In the depicted example where the domestic appliance 100 is an oven, the treatment mode sub-category chosen is an oven mode sub-category. FIG. 4B shows further steps of an exemplary method if the controller has determined that the user has chosen the contents sub-category. In the depicted example where the domestic appliance 100 is an oven, the contents sub-category chosen is a cooking guide sub-category. FIG. 4C shows further steps of an exemplary method if the controller has determined that the user has chosen the accessories sub-category. In the depicted example where the domestic appliance 100 is an oven, the accessories sub-category chosen is an accessories sub-category. The various steps of each of these exemplary methods will now be further described in turn.

Figure 6:
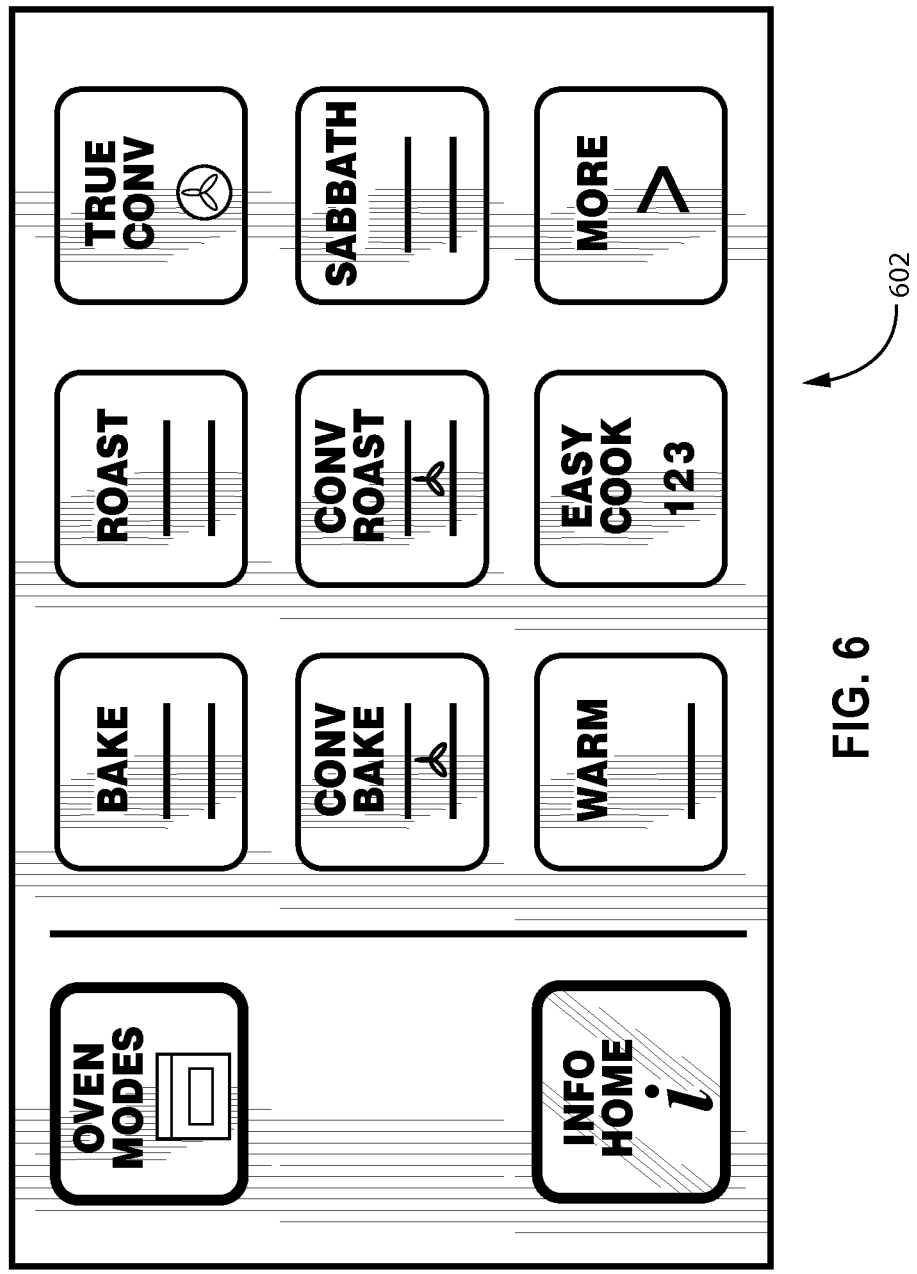
FIG. 6 is an oven mode selection screen that may be shown by the domestic appliance, according to an example of the present technology.
Figure 7:
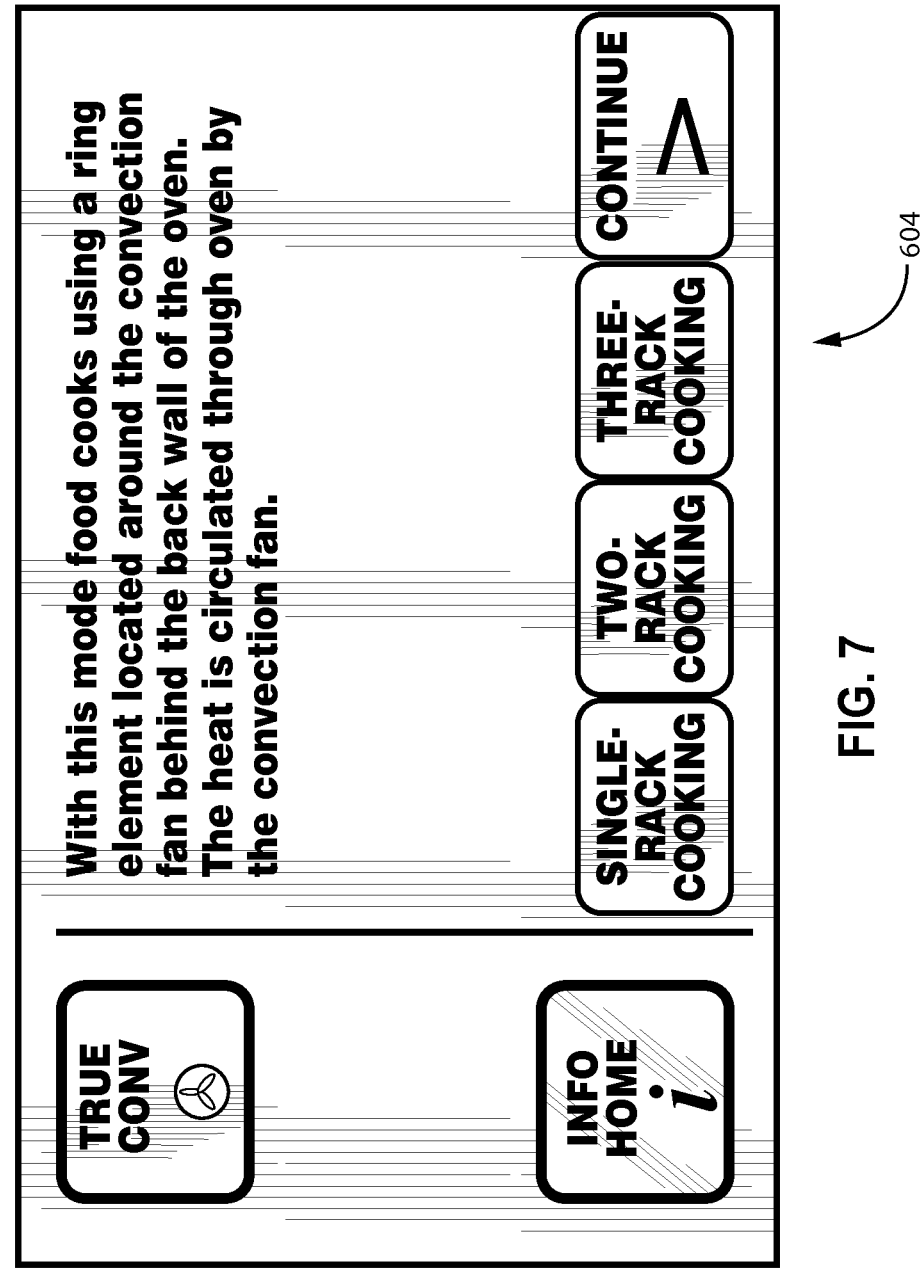
FIG. 7 is an oven mode info screen that may be shown by the domestic appliance, according to an example of the present technology.
Figure 8:
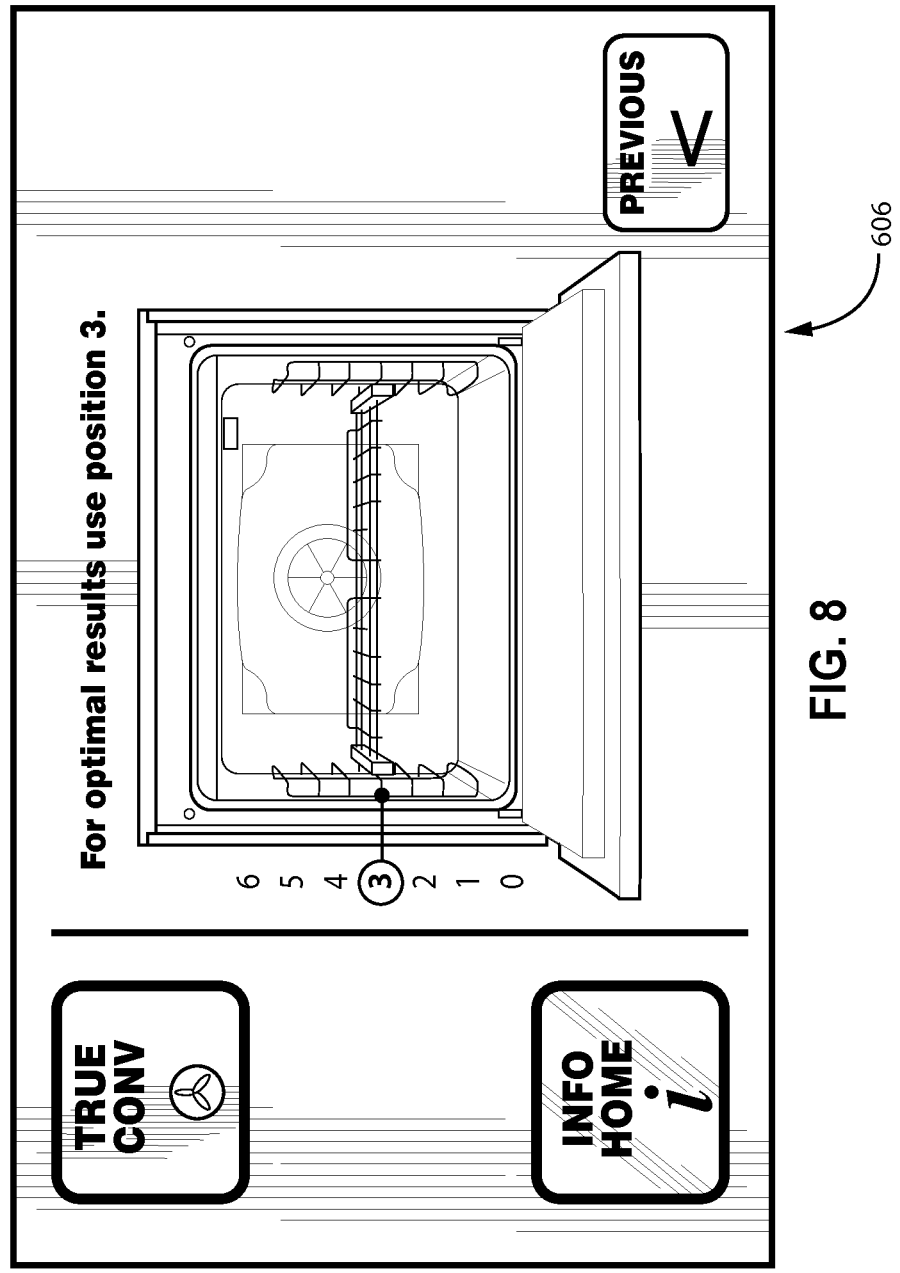
FIG. 8 is a rack position info screen that may be shown by the domestic appliance, according to an example of the present technology.

The exemplary method of FIG. 4A may be a continuation of the method of FIG. 4 when the controller determines that the user has selected the treatment mode sub-category. Once this determination is made, the display 300 may display a treatment mode selection screen 600 that is shown in FIG. 6 and discussed in greater detail below. In the depicted example where the domestic appliance 100 is an oven, the treatment mode sub-category chosen is an oven mode sub-category and the treatment mode selection screen is an oven mode selection screen. The user may then provide and the user input component may detect or receive user input to select an oven mode from the plurality of mode options presented to the user. Based on the oven mode selected, the display 300 may then be instructed by the controller 500 to display an oven mode info screen 604 that is shown in FIG. 7 and described in more detail below. The user may then provide and the user input component may receive or detect further user input to indicate a number of oven racks or advance to an additional oven mode info screen. The controller 500 may then determine whether the user input is associated with a number of oven racks or a page advance. If the controller 500 determines that the user input determines that the user input is associated with a number of oven racks, then the controller may instruct the display 300 to display a rack position info screen 606, as shown in FIG. 8 and discussed further below. If the controller 500 determines that the user input is associated with a page advance, then the controller may instruct the display 300 to display a subsequent oven mode info screen.

Figure 11:
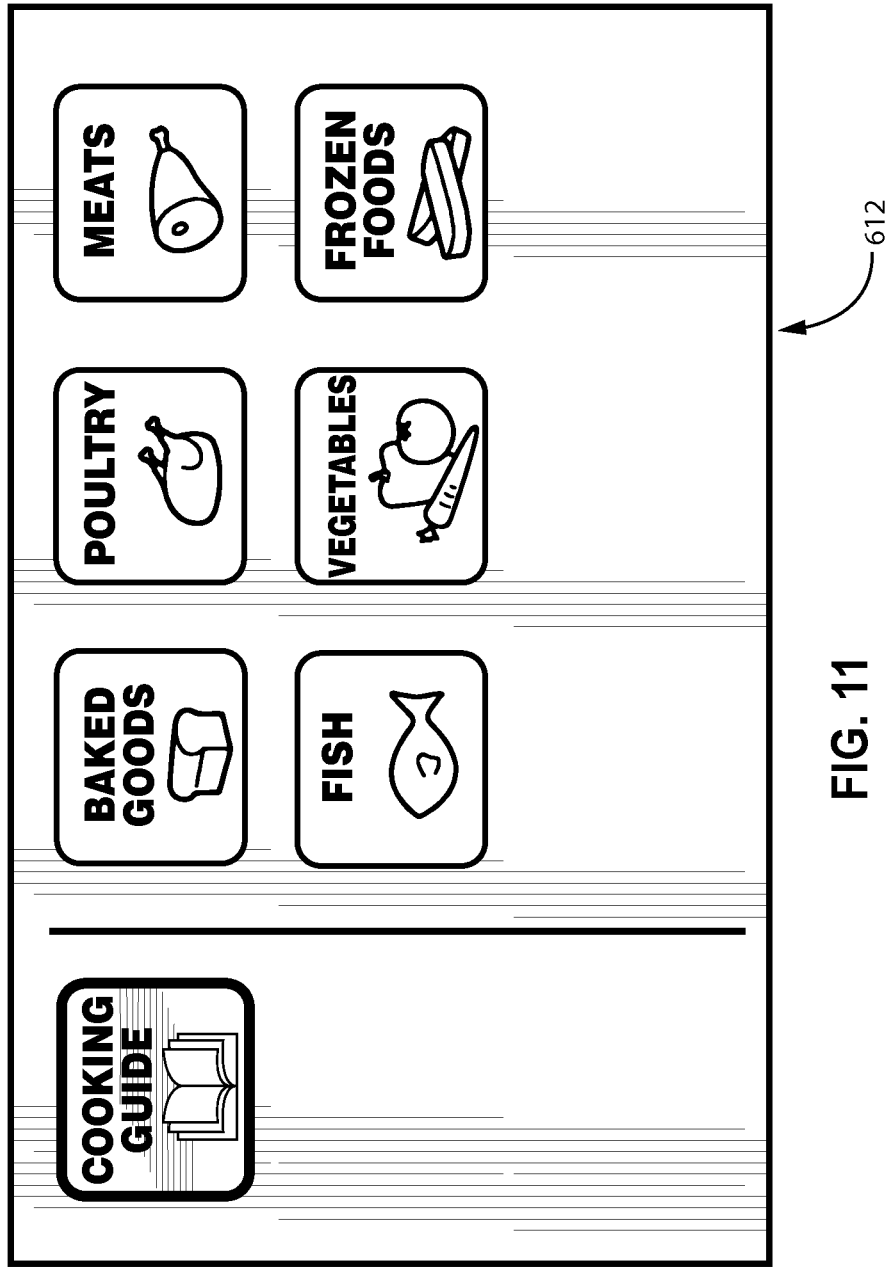
FIG. 11 is a food category selection screen that may be shown by the domestic appliance, according to an example of the present technology.
Figure 12:
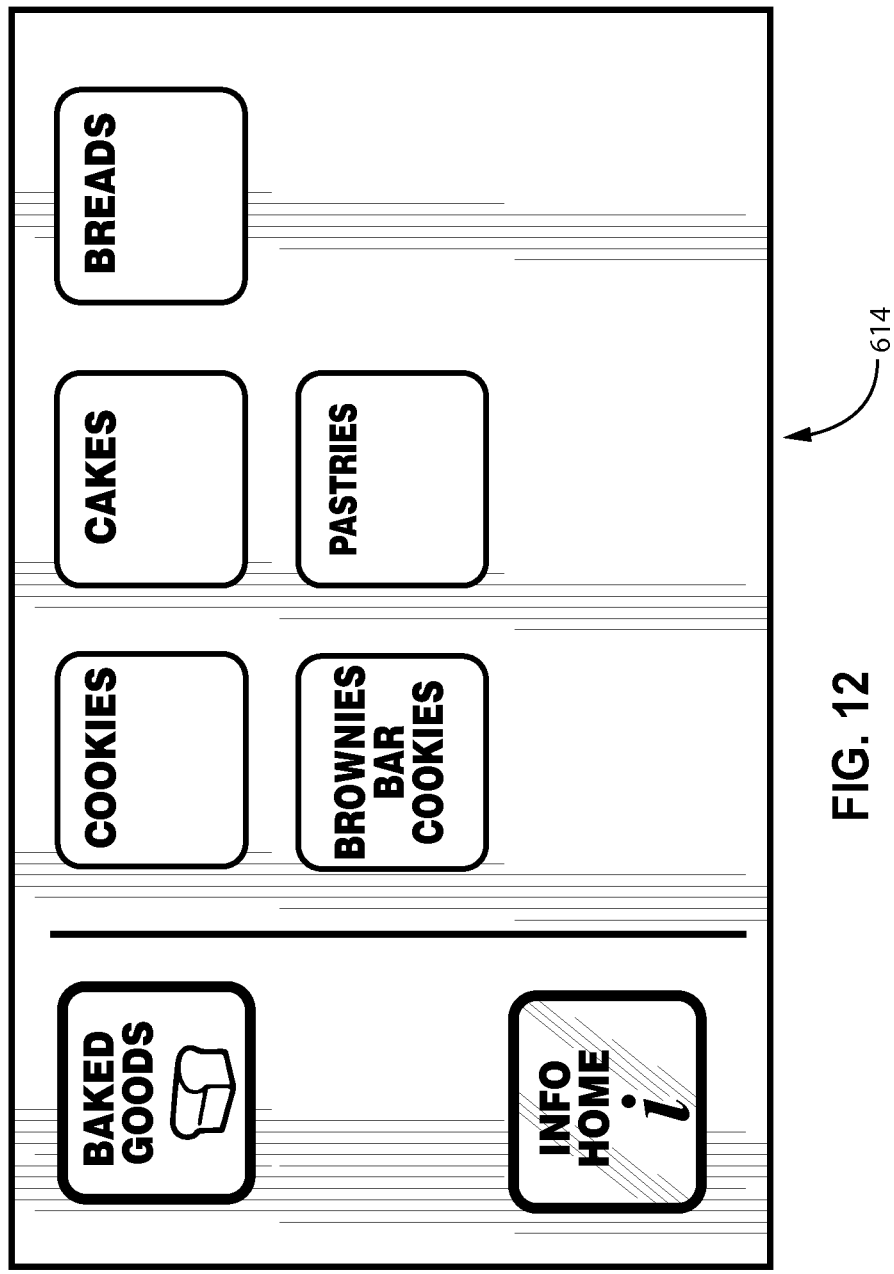
FIG. 12 is a food type selection screen that may be shown by the domestic appliance, according to an example of the present technology.
Figure 13:
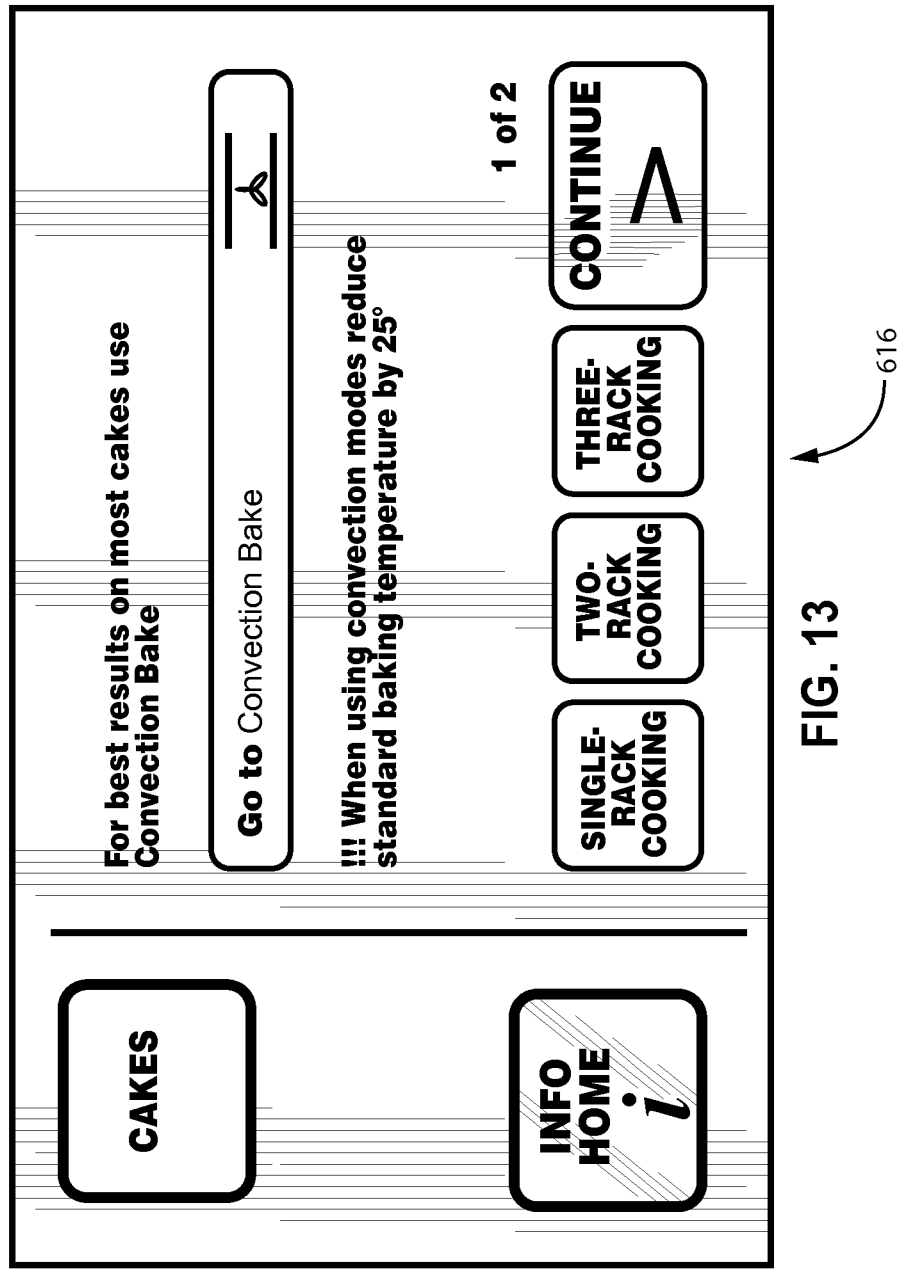
FIG. 13 is a food type info screen that may be shown by the domestic appliance, according to an example of the present technology.
Figure 14:
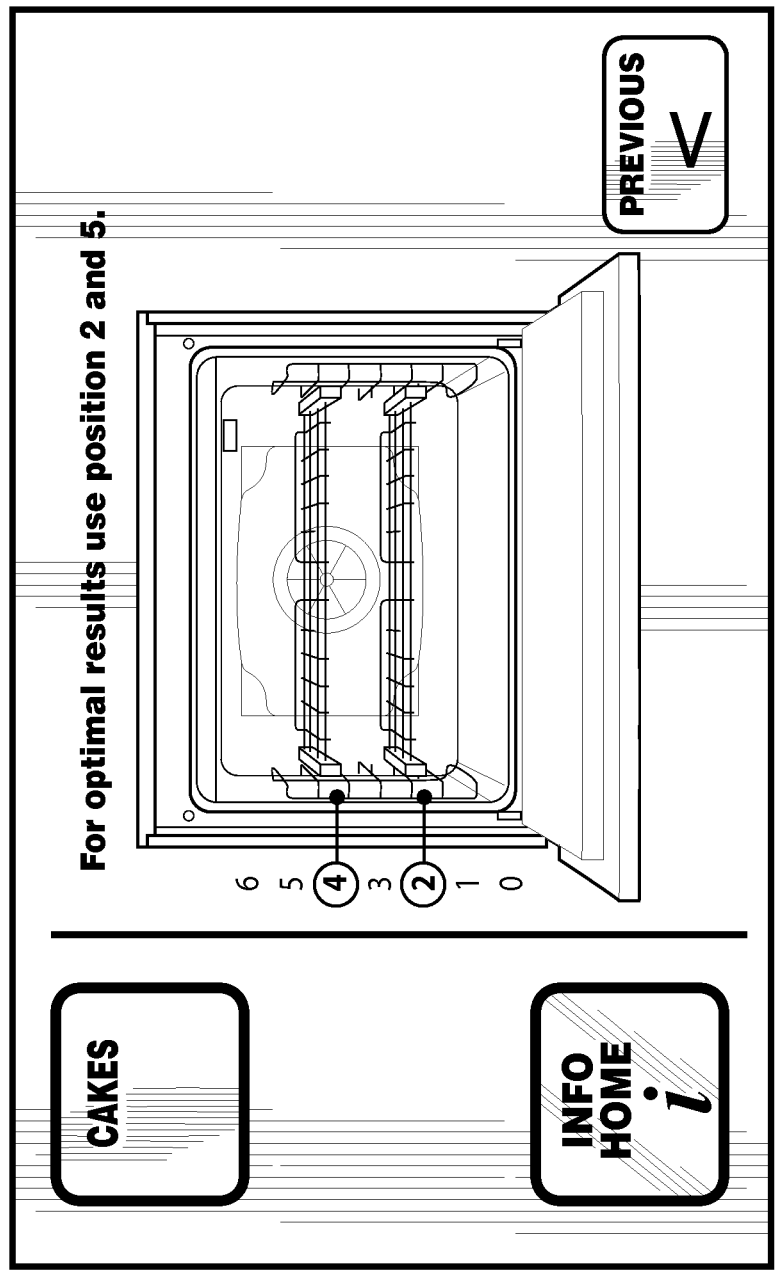
FIG. 14 is another rack position info screen that may be shown by the domestic appliance, according to an example of the present technology.

The exemplary method of FIG. 4B may be a continuation of the method of FIG. 4 when the controller determines that the user has selected the contents sub-category. Once this determination is made, the display 300 may display a contents selection screen 612 that is shown in FIG. 11 and discussed in greater detail below. In the depicted example where the domestic appliance 100 is an oven, the contents sub-category chosen is a cooking guide sub-category and the contents selection screen is a food category selection screen. The user may then provide and the user input component may detect or receive user input to select food category from the plurality of food category options presented to the user. Based on the food category selected, the display 300 may then be instructed by the controller 500 to display a food type selection screen 614 that is shown in FIG. 12 and described in more detail below. The user may then provide and the user input component may detect or receive user input to select a food type from the plurality of food type options presented to the user. Based on the food type selected, the display 300 may then be instructed by the controller 500 to display a food type info screen 616 that is shown in FIG. 13 and described in more detail below. The user may then provide and the user input component may receive or detect further user input to indicate a number of oven racks or advance to an additional oven mode info screen. The controller 500 may then determine whether the user input is associated with a number of oven racks or a page advance. If the controller 500 determines that the user input determines that the user input is associated with a number of oven racks, then the controller may instruct the display 300 to display a rack position info screen 618, as shown in FIG. 14 and discussed further below. If the controller 500 determines that the user input is associated with a page advance, then the controller may instruct the display 300 to display a subsequent oven mode info screen.

Figure 9:
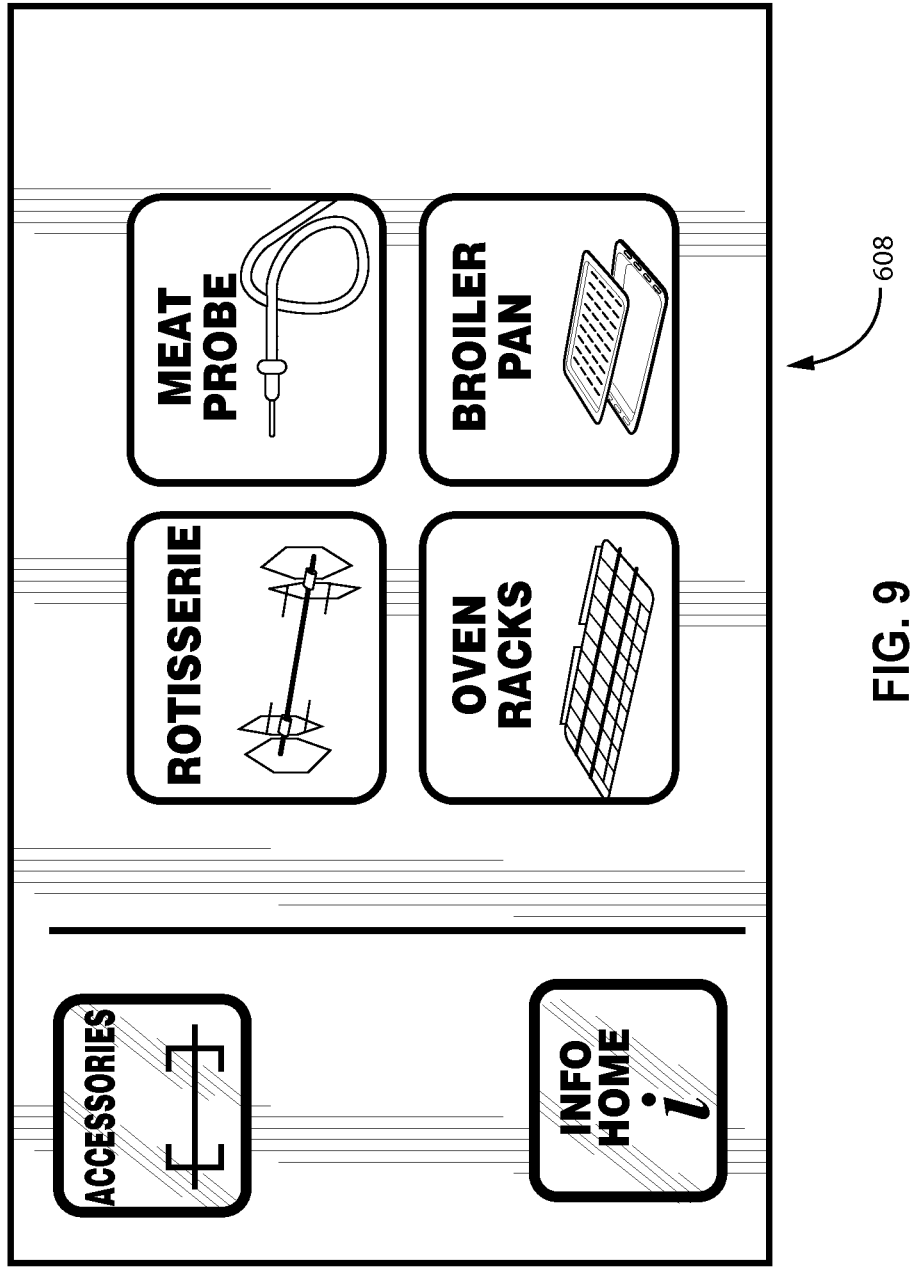
FIG. 9 is an accessory selection screen that may be shown by the domestic appliance, according to an example of the present technology.
Figure 10:
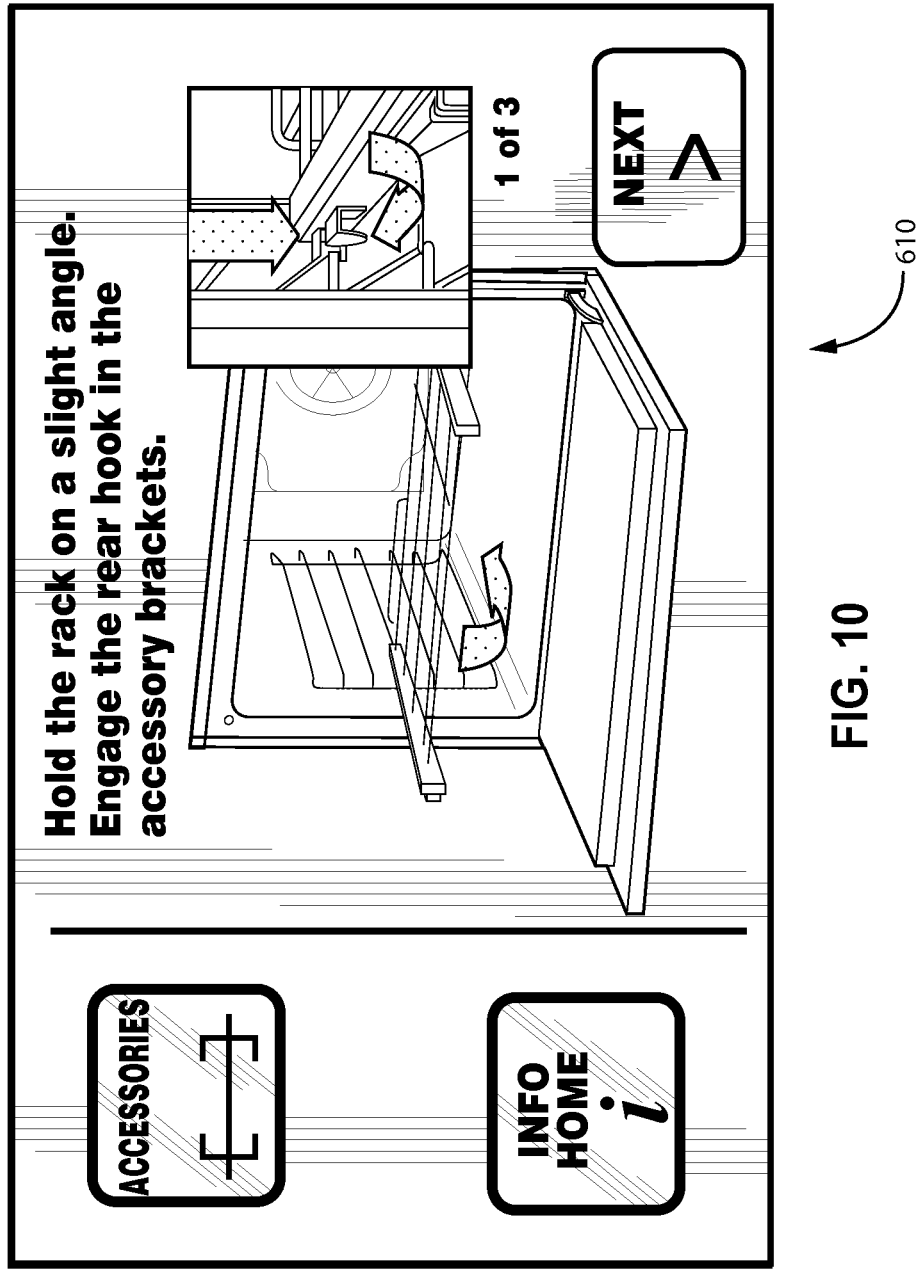
FIG. 10 is an accessory info screen that may be shown by the domestic appliance, according to an example of the present technology.

The exemplary method of FIG. 4C may be a continuation of the method of FIG. 4 when the controller determines that the user has selected the accessories sub-category. Once this determination is made, the display 300 may display an accessories selection screen 608 that is shown in FIG. 9 and discussed in greater detail below. The user may then provide and the user input component may detect or receive user input to select an accessory from the plurality of accessory options presented to the user. Based on the accessory selected, the display 300 may then be instructed by the controller 500 to display an accessory info screen 610 that is shown in FIG. 10 and described in more detail below. The user may then provide and the user input component may receive or detect further user input to indicate a page advance to an additional accessory info screen. The controller 500 may then instruct the display 300 to display an additional accessory info screen.

Additionally, the method may comprise the user providing and the user input component receiving or detecting further user input. The controller 500, upon receiving this subsequent user input from the user input component, may then cause the display 300 to display the first screen. In the example discussed here, the user input component may be the button 506 associated with the info mode and these steps may be associated with the user causing the domestic appliance 100 to exit the info mode and return to the screen displayed prior to entering the info mode. The first screen, in this case, may be any of a number of other screens such as those displaying a variety of parameters that have been or may be programmed for operation of the appliance.

The method may also comprise tracking, with a timer, a period of inactivity by the user wherein the buttons and/or user input components do not receive or detect user input. After a period of time has passed without receiving user input, the controller 500 may instruct the display 300 to return to displaying the first screen. The additional steps described here may be understood to manifest an automatic reversion to a screen outside of the info mode after an idle period. This same automatic reversion may instead cause the display to display other screens, such as the info mode home screen 600 shown in FIG. 5 and discussed below. Again, the first screen may be any of a number of other screens such as those displaying a variety of parameters that have been or may be programmed for operation of the appliance.

In the exemplary screen shown in FIG. 5, an info mode home screen 600 is displayed. This screen may display the various sub-categories or regions which the user may select to enter a specific info mode. In this particular exemplary screen, the user may select from an "OVEN MODES" sub-category, a "COOKING GUIDE" sub-category, and an "ACCESSORIES" sub-category. It should be understood, however, that any number of additional or alternative sub-categories may be included.

The exemplary screen shown in FIG. 6 is an oven mode selection screen 602 and may display the various oven modes from which the user may choose. These oven mode selections may also represent the various oven modes by which the oven may operate. The user in this screen is presented with oven mode options such as baking, roasting, convection baking, and keep warm, amongst others. It should be understood, however, that any number of additional or alternative oven modes may be included. The user may also choose to advance to a subsequent page that lists further oven modes or the user may select INFO HOME to return to the info mode home screen 600. The INFO HOME selection should be understood to be an optional selection within any or all of the screens displayed in the various info modes, therefore it should be understood that no further discussion of its inclusion on further screens is necessary.

In the oven mode info screen 604 shown in FIG. 7, the user is presented with information describing the selected oven mode. In this particular oven mode info screen, information is presented on a "TRUE CONVECTION" oven mode. Additionally, the user may select the number of oven racks anticipated to be used in the chosen treatment mode or if the oven mode info screen requires additional pages to present all of the pertinent information the user may choose to advance to a subsequent page.

In the rack position info screen 606 shown in FIG. 8, the user is presented with information showing how where to locate an oven rack within the oven based on the oven mode chosen and the number of racks desired. In this particular screen, the user has chosen the "TRUE CONVECTION" mode and has inputted that one rack will be used.

The exemplary screen shown in FIG. 9 is an accessories selection screen 608 and may display the various accessories, from which the user may choose, for use with the appliance. In this particular screen the user is presented with options for information about a rotisserie, a meat or temperature probe, oven racks, and a broiler pan. It should be understood, however, that any number of additional or alternative accessories may be included.

The exemplary screen shown in FIG. 10 is an accessory info screen 610. In this particular example the screen displays information about the oven racks according to the user's selection of this accessory in the accessories selection screen 608. Specifically, this screen is demonstrating to the user how to place an oven rack within the treatment chamber of the oven. The accessory info screen may include a number of pages or screens, as in the present example, where one page or screen cannot accommodate all of the relevant information. In such a case, the user may choose to advance to the next page or screen of information and may also choose to return to the preceding page or screen.

The exemplary screen shown in FIG. 11 is a food category selection screen 612. This screen may be displayed when the user has chosen the cooking guide sub-category. In this screen the user is presented with a variety of food category selections and is the first screen in the process of the user narrowing down the food type desired to be cooked so that the info mode may convey information on how to cook that particular type of food. This exemplary screen provides the user with selections such as baked goods, poultry, meats, fish, vegetables, and frozen foods. It should be understood, however, that any number of additional or alternative food categories may be included.

In the exemplary screen shown in FIG. 12, the user is presented with a food type selection screen 614. This particular screen provides the user with a choice from among a variety of food types within the chosen food category. In the instance pictured here, the user has chosen "BAKED GOODS" as the food category and the user is presented with a selection of food types that includes cookies, cakes, breads, brownies and bar cookies, and pastries. It should be understood, however, that any number of additional or alternative food types may be included.

The exemplary screen of FIG. 13 is a food type info screen 616. This screen may present the user with information about how best to cook the chosen food type. In this particular example, the user has chosen "CAKES" as the food type and the food type info screen 616 is recommending a treatment mode for the preparation of cakes. Also, the user may select a number of oven racks desired to use in cooking or the user may choose to view an additional page or screen if necessary to provide the user with further information on preparation of the selected food type.

FIG. 14 shows another exemplary rack position info screen 618. This particular screen may be reached by the user after selecting a number of racks from the food type info screen 616. In this particular screen, the user has chosen cakes as the food type and the rack position info screen 618 is presenting the user with a recommended placement of oven racks based on the recommended treatment mode for selected food type and the number of racks determined to be necessary by the user.

FIG. 15 shows a frontal view of an exemplary user interface 200 that may be included with a domestic appliance 100. The user interface 200 may include a display 300 for displaying information and screens, including, but not limited to, the screens described above. Additionally, the user interface 200 may comprise a plurality of buttons 506 and a user input component 508. The buttons 506 may be capacitive touch buttons and include a form of backlit display to indicate to the user the function associated with each button. The user input component 508 may be a capacitive touch panel and may further be coextensive with the display 300, such that the user may interact with the display in a commonly understood touchscreen manner.

While the present technology has been described in connection with what are presently considered to be the most practical and preferred examples, it is to be understood that the technology is not to be limited to the disclosed examples, but on the contrary, is intended to cover various modifications and equivalent arrangements included within the spirit and scope of the technology.

What is claimed is:

1. A method for controlling a domestic appliance having a display, at least two distinct user input components, and a controller, the method comprising:
   displaying a first screen on the display;
   detecting user input to a first user input component;
   displaying a second screen on the display in response to the user input to the first component, said second screen comprising an info mode home screen displaying a plurality of info mode sub-categories, and said plurality of info mode sub-categories including:
      an accessories sub-category associated with an accessories selection screen showing a plurality of accessories;
      a contents sub-category associated with a contents category selection screen showing a plurality of contents categories; and
      a treatment most sub-category associated with a treatment mode selection screen showing a plurality of treatment modes;
   detecting user input to a second user input component, said user input being associated with one of the plurality of info mode sub-categories;
   determining the info mode sub-category associated with the user input to the second user input component with the controller; and
   displaying a third screen on the display in response to the user input associated with the info mode sub-category determined by the controller, said third screen comprising one of the accessories selection screen, the contents category selection screen, and the treatment mode selection screen.

2. The method of claim 1, wherein the contents category selection screen comprises a food category selection screen showing a plurality of food categories and the treatment mode selection screen comprises an oven mode selection screen showing a plurality of oven modes.

3. The method of claim 2, wherein when the controller determines that the user input was made to the treatment mode sub-category, the third screen is the oven mode selection screen and the method further comprises:
   detecting user input associated with one of the plurality of oven modes to the second user input component; and
   displaying an oven mode info screen associated with and showing information about the selected oven mode in response to the user input associated with one of the plurality of oven modes.

4. The method of claim 3, further comprising:
   detecting user input to the second user input component;
   determining whether the user input is associated with a page advance or a quantity of oven racks with the controller;
   when the user input is determined to be associated with the page advance, displaying an additional oven mode info screen associated with and showing information about the selected oven mode; and
   when the user input is determined to be associated with the quantity of oven racks, displaying a rack position info screen showing information about oven rack positioning.

5. The method of claim 2, wherein when the controller determines that the user input was made to the accessories sub-category, the third screen is the accessories selection screen and the method further comprises:
   detecting user input associated with one of the plurality of accessories to the second user input component; and
   displaying an accessory info screen associated with and showing information about the selected accessory in response to the user input associated with one of the plurality of accessories.

6. The method of claim 5, further comprising:
   detecting user input associated with a page advance to the second user input component; and
   displaying an additional accessory info screen associated with and showing information about the selected accessory in response to the user input associated with the page advance.

7. The method of claim 2, wherein when the controller determines that the user input was made to the contents sub-category, the third screen is the food category selection screen and the method further comprises:
   detecting user input associated with one of the plurality of food categories to the second user input component;
   displaying a food type selection screen associated with the selected food category and showing a plurality of food types in response to the user input associated with one of the plurality of food categories;
   detecting user input associated with one of the plurality of food types to the second user input component; and
   displaying a food type info screen associated with and showing information about the selected food type in response to the user input associated with one of the plurality of food types.

8. The method of claim 7, further comprising:
   detecting user input to the second user input component;

determining whether the user input is associated with a page advance or a quantity of oven racks with the controller;

when the user input is determined to be associated with the page advance, displaying an additional food type info screen associated with and showing information about the selected food type; and when the user input is determined to be associated with the quantity of oven racks, displaying a rack position info screen showing information about oven rack positioning.

9. The method of claim 1, further comprising:
detecting user input to the first user input component; and
displaying the first screen on the display.

10. The method of claim 1, further comprising:
tracking a period of time with a timer without user input being detected by the first user input component or the second user input component; and
displaying the first screen on the display after a predetermined period of time tracked by the timer has elapsed.

11. The method of claim 1, wherein the first user input component comprises at least one button, and
wherein the second user input component comprises a touch panel and said second user input component is substantially coextensive with said display and separate from the first user input component.

12. A domestic appliance to treat contents, the domestic appliance comprising:
a display;
a first user input component configured to detect user input;
a second user input component configured to detect user input and distinct from the first user input component; and
a controller programmed to:
instruct the display to display a first screen;
receive user input detected by the first user input component;
instruct the display to display a second screen in response to the user input to the first component, said second screen comprising an info mode home screen displaying a plurality of info mode sub-categories, and said plurality of info mode sub-categories including:
an accessories sub-categories associated with an accessories selection screen showing a plurality of accessories;
a contents sub-category associated with a contents category selection screen showing a plurality of contents categories; and
a treatment mode sub-category associated with a treatment mode selection screen showing a plurality of treatment modes;
receive user input detected by the second user input component, said user input being associated with one of the plurality of info mode sub-categories;
determine the info mode sub-category associated with the user input to the second user input component; and
instruct the display to display a third screen in response to the user input associated with the info mode sub-category determined by the controller, said third screen comprising one of the accessories selection screen, the contents category selection screen, and the treatment mode selection screen.

13. The domestic appliance of claim 12, wherein the contents category selection screen comprises a food category selection screen showing a plurality of food categories and the treatment mode selection screen comprises an oven mode selection screen showing a plurality of oven modes.

14. The domestic appliance of claim 13, wherein when the info mode sub-category determined by the controller is the treatment mode sub-category, the third screen is the oven mode selection screen and the controller is programmed to:
receive user input associated with one of the plurality of oven modes detected by the second user input component; and
instruct the display to display an oven mode info screen associated with and showing information about the selected oven mode in response to the user input associated with one of the plurality of oven modes.

15. The domestic appliance of claim 14, wherein the controller is programmed to:
receive user input to the second user input component;
determine whether the user input is associated with a page advance or a quantity of oven racks with the controller;
when the user input is determined to be associated with the page advance, instruct the display to display an additional oven mode info screen associated with and showing information about the selected oven mode; and
when the user input is determined to be associated with the quantity of oven racks, instruct the display to display a rack position info screen showing information about oven rack positioning.

16. The domestic appliance of claim 13, wherein when the info mode sub-category determined by the controller is the accessories sub-category, the third screen is the accessories selection screen and the controller is programmed to:
receive user input associated with one of the plurality of accessories detected by the second user input component; and
instruct the display to display an accessory info screen associated with and showing information about the selected accessory in response to user input associated with one of the plurality of accessories.

17. The domestic appliance of claim 16, wherein the controller is programmed to:
receive user input associated with a page advance detected by the second user input component; and
instruct the display to display an additional accessory info screen associated with and showing information about the selected accessory in response to the user input associated with the page advance.

18. The domestic appliance of claim 13, wherein when the info mode sub-category determined by the controller is the contents sub-category, the third screen is the food category selection screen and the controller is programmed to:
receive user input associated with one of the plurality of food categories detected by the second user input component;
instruct the display to display a food type selection screen associated with the selected food category showing a plurality of food types in response to the user input associated with one of the plurality of food categories;
receive user input associated with one of the plurality of food types detected by the second user input component; and
instruct the display to display a food type info screen associated with and showing information about the selected food type in response to the user input associated with one of the plurality of food types.

19. The domestic appliance of claim 18, wherein the controller is programmed to:

receive user input to the second user input component;

determine whether the user input is associated with a page advance or a quantity of oven racks with the controller;

when the user input is determined to be associated with the page advance, instruct the display to display an additional food type info screen associated with and showing information about the selected food type; and when the user input is determined to be associated with the quantity of oven racks, instruct the display to display a rack position info screen showing information about oven rack positioning.

20. The domestic appliance of claim 12, wherein the controller is programmed to:

receive user input detected by the first user input component; and instruct the display to display the first screen on the display.

21. The domestic appliance of claim 12, further comprising a timer programmed to track a period of time, wherein the controller is programmed to instruct the display to display the first screen after the period of time tracked by the timer has elapsed without intervening user input being detected by the first user input component or the second user input component.

22. The domestic appliance of claim 12, wherein the first user input component comprises at least one button, and wherein the second user input component comprises a touch panel and said second user input component is substantially coextensive with said display and separate from the first user input component.

* * * * *